US010134396B2

(12) United States Patent
Campbell et al.

(10) Patent No.: US 10,134,396 B2
(45) Date of Patent: Nov. 20, 2018

(54) PREVENTING OF AUDIO ATTACKS

(71) Applicant: Google LLC, Mountain View, CA (US)

(72) Inventors: Lee Campbell, Mountain View, CA (US); Samuel Kramer Beder, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/371,929

(22) Filed: Dec. 7, 2016

(65) Prior Publication Data

US 2018/0158454 A1 Jun. 7, 2018

(51) Int. Cl.
*G06Q 20/32* (2012.01)
*G06Q 20/40* (2012.01)
*G10L 15/22* (2006.01)
*G10L 15/30* (2013.01)
*H04L 12/58* (2006.01)

(52) U.S. Cl.
CPC .............. *G10L 15/22* (2013.01); *H04L 51/18* (2013.01); *H04L 51/20* (2013.01); *G06Q 20/32* (2013.01); *G06Q 20/40145* (2013.01); *G10L 15/30* (2013.01); *G10L 2015/223* (2013.01)

(58) Field of Classification Search
CPC .. G06Q 20/32; G06Q 20/40145; G06Q 20/02; G10L 15/22; G10L 15/30
USPC ............................................ 713/186; 705/39
See application file for complete search history.

(56) References Cited

U.S. PATENT DOCUMENTS

| 6,480,825 | B1 | 11/2002 | Sharma et al. |
| 6,496,581 | B1 | 12/2002 | Finn et al. |
| 6,507,653 | B1 | 1/2003 | Romesburg |
| 6,741,874 | B1 | 5/2004 | Novorita et al. |
| 6,904,146 | B2 | 6/2005 | Domer et al. |
| 6,928,161 | B1 | 8/2005 | Graumann |
| 7,447,321 | B2 | 11/2008 | Furge et al. |
| 7,602,925 | B2 | 10/2009 | Kreifeldt et al. |
| 8,099,289 | B2 | 1/2012 | Mozer et al. |
| 8,452,597 | B2 | 5/2013 | Bringert et al. |
| 8,719,039 | B1 | 5/2014 | Sharifi |
| 8,996,381 | B2 | 3/2015 | Mozer et al. |
| 2002/0035539 | A1* | 3/2002 | O'Connell ............. G06Q 20/02 705/39 |

(Continued)

FOREIGN PATENT DOCUMENTS

WO WO2014186090 11/2014
WO WO 2016/003299 1/2016

OTHER PUBLICATIONS

Diao et al. "Your Voice Assistant is Mine," Security and privacy in Smartphones & Mobile Devices, ACM, Nov. 7, 2014, 12 pages.

(Continued)

*Primary Examiner* — Farzad Kazeminezhad
(74) *Attorney, Agent, or Firm* — Fish & Richardson P.C.

(57) ABSTRACT

In some implementations, a method is performed by computing devices, and includes receiving a first message indicating that an improper voice command has been detected by a first device, identifying a user account associated with the first device based on the first message, identifying a second device associated with the user account, and, in response to receiving the first message indicating that the voice command detected by the first device is improper, sending a second message to the second device, the second message indicating that the voice command should not be performed.

19 Claims, 6 Drawing Sheets

(56) References Cited

U.S. PATENT DOCUMENTS

| | | | | |
|---|---|---|---|---|
| 2005/0273626 | A1* | 12/2005 | Pearson | G06Q 20/32 713/186 |
| 2008/0312934 | A1 | 12/2008 | Cerra et al. | |
| 2009/0043580 | A1 | 2/2009 | Mozer et al. | |
| 2011/0223893 | A1 | 9/2011 | Lau et al. | |
| 2013/0325484 | A1 | 5/2013 | Chakladar et al. | |
| 2014/0274203 | A1 | 9/2014 | Ganong, III et al. | |
| 2014/0343949 | A1 | 11/2014 | Huang et al. | |
| 2015/0235637 | A1 | 8/2015 | Casado et al. | |
| 2015/0235651 | A1 | 8/2015 | Sharifi | |
| 2015/0294666 | A1 | 10/2015 | Miyasaka et al. | |
| 2016/0027440 | A1 | 1/2016 | Gelfenbeyn et al. | |
| 2016/0364729 | A1* | 12/2016 | Ruparelia | G06Q 20/40145 |
| 2017/0110144 | A1 | 4/2017 | Sharifi | |
| 2018/0158453 | A1 | 6/2018 | Campbell et al. | |

OTHER PUBLICATIONS

International Search Report and Written Opinion issued in International Application No. PCT/US2017/032667, dated Sep. 6, 2017, 15 pages.
Jang et al. "Ally Attacks," Computer and communications Security, ACM, Nov. 3, 2014, 13 pages.
Petracca et al. "AuDroid: Preventing Attacks on Audio Channels in Mobile Devices," arXiv 1604.00320v1, Apr. 1, 2016, 10 pages.
www.Sensory.com [online]. "Fortemedia Announces a Low Power, Key Word Spotting Voice Trigger and Control IC," Dec. 10, 2014 [retrieved on Dec. 7, 2016] Retrieved from the Internet: URL <http://www.sensory.com/fortemedia-announces-low-power-key-word-spotting-voice-trigger-control-ic/.
www.networkworld.com [online]. "Voice hackers can record your voice then use morpher to trick authentication systems," Sep. 30, 2015 [retrieved on Dec. 7, 2012] Retrieved from the Internet: URL<http://www.networkworld.com/article/2988133/security/voice-hackers-can-record-your-voice-then-use-morpher-to-trick-authentication-systems.html.
www.georgetown.edu [online]. "Hidden Voice Commands," Aug. 2016 [retrieved on Dec. 7, 2016] Retrieved from the Internet: URL<https://www.georgetown.edu/sites/www/files/Hidden%20Voice%20Commands%20full%20paper.pdf.
www.venture beat.com [online] "How Nuance tapped the cloud to bring voice recognition to mobile . . . and beyond," Sep. 8, 2013, [Retrieved on Dec. 7, 2016] Retrieved from the Internet:URL<http://venturebeat.com/2013/09/08/how-nuance-tapped-the-cloud-to-bring-voice-recognition-to-mobile/.

* cited by examiner

PREVENTING OF AUDIO ATTACKS

BACKGROUND

This specification generally relates to security of devices, including Internet-connected devices. Some such devices are capable of receiving, processing, and executing voice commands. In some instances, voice commands are preceded by indicator words or phrases, known as hotwords.

SUMMARY

Internet-connected devices can become compromised by malicious attackers. At the same time, these devices are often given access to users' data and to other connected devices. Some devices are capable of receiving, parsing, and executing voice commands. For example, an Internet-connected device can be integrated with a module that receives and processes voice commands for the device. To prevent execution of unintentional commands, a hotword may be used to signal the beginning of a command. Hotwords can alert the module that audio following the hotword is to be processed as a user voice request, e.g., a command, a query, etc. In some general implementations, hotwords can be used as authentication measures. For example, certain voice commands may only be executed by a device if a specific hotword is spoken prior to issuing the command. Modules for receiving and processing commands for Internet-connected devices often include voice recognition and audio processing models that detect specific words, including hotwords and commands.

When an Internet-connected device capable of receiving and executing voice commands becomes compromised, the attacker can potentially issue fraudulent commands on behalf of an authorized user of the device. For example, an attacker may cause a recorded audio command to be output through the device's speaker. The audio could then be detected by the device's microphone, and the device may recognize and accept the command. Such attacks are particularly dangerous to users because attackers could then possibly issue commands ranging from stealing a user's personal information (e.g., commanding the device to list Anthony's calendar events) to theft (e.g., commanding the device to transfer money from Sarah's bank account for fraudulent purchases) to physical danger (e.g., commanding the device to unlock Connor's front door).

Generally, some devices capable of receiving and executing voice commands may lessen the risk that a microphone of a device listens to the output of the speaker of the device using audio "eraser" functionality. The eraser refers to functionality implemented either through software or through physical components to dampen the amount of audio output from a device that is received at the device. For example, the audio eraser may attempt to cancel noise by subtracting output audio signals from the input detected by a microphone of a device. However, the eraser often does not completely remove audio output by the device, and so the device may still be able to pick up a fake voice command coming from the device's speaker, leaving a user of the device vulnerable if a malicious command is issued.

In some implementations, a device uses an audio processing model to detect hotwords that occur in the audio output of a device. For example, the device may use a hotword detection model to detect hotwords in the audio output signals that a device provides to an audio speaker device. By monitoring its own audio output, a device can guard against fraudulently issued voice commands. When a falsified voice command is detected, the model blocks the standard processing of voice commands to avoid execution of the fraudulent command. For example, the model can communicate with one or more command processing modules and instruct them to cancel or disregard a hotword or command that is being received.

The model that analyzes the audio output data to detect hotwords is referred to generally as an eraser hotword model. In some implementations, the eraser hotword model which analyzes a device's audio output is a separate model from a general hotword recognition model that analyzes audio input received through a microphone. In some implementations, a single hotword model can perform both functions. The eraser hotword model may detect that a hotword was output from the speaker of the device, and may use the information to control operation of the main audio processing module of the device. In some implementations, the eraser hotword model may disable a hotword recognition model of the device to prevent the device from accepting a voice command that follows the fraudulent hotword.

In addition, devices can communicate with a server and on a local network to inform nearby devices of fraudulent hotwords. A device with an eraser hotword model may detect when the device outputs the fraudulent hotword. However, other devices nearby would not be able to determine that the hotword was fraudulent. As a result, when one device detects a fraudulent hotword, it may inform others so that they also disregard the hotword and any associated command. For example, a device may be configured to send a message to a server system when a fraudulent hotword is detected. The server can use stored user account data to identify other devices owned by the same user and send messages to those devices to inform them that a particular instance of a hotword should be ignored. If devices attempt to act on the fraudulent hotword, the server system can deny the requests to carry out a voice command corresponding to the hotword. Further, the device that detects the fraudulent hotword may communicate directly or over a local area network, e.g., using BLUETOOTH or WI-FI, to inform devices to ignore a certain instance of a hotword. In this manner, the security afforded by a hotword eraser model can be extended to other devices.

In general, one innovative aspect of the subject matter described in this specification can be embodied in a method that includes receiving, at a processing module of a device, output audio data that represents audio output by the device, receiving, by the processing module, input audio data that represents audio detected by a microphone, determining, by the processing module, that the output audio data includes a representation of a hotword, wherein the hotword is a word or phrase previously designated to precede a voice command, and, based on determining that the output audio data includes the representation of the hotword, blocking, by the processing module, use of the input audio data to initiate a command.

Implementations may include one or more of the following features. For example, the hotword may be a predetermined word that has been designated to signal the beginning of a voice query or voice command that immediately follows the hotword. In some examples, the processing module includes an input hotword detection model that determines that the input audio data includes a representation of a hotword, and an output hotword detection model that determines that the output audio data includes a representation of a hotword.

In some examples, determining that the output audio includes a representation of a hotword includes generating, by the output hotword detection model, a hotword score for the output audio data, comparing, by the output hotword detection model, the hotword score to a predetermined threshold, and determining, by the output hotword detection model and based on the comparing, that the output audio includes a representation of a hotword. In some examples, the method includes generating, by the input hotword detection model, a separate hotword score for the output audio data, comparing, by the input hotword detection model, the separate hotword score to a separate predetermined threshold, confirming, by the input hotword detection model and based on the comparing, that the output audio data includes a representation of a hotword, and based on the confirming that the output audio data includes the representation of the hotword, blocking, by the processing module, use of the input audio data to initiate a command. In some examples, the predetermined threshold is different from the separate predetermined threshold. In some examples, the output hotword detection model is a trained neural network, and wherein the input hotword detection model is a trained neural network. In some examples, the predetermined threshold is determined by the output hotword detection model during training, and wherein the separate predetermined threshold is determined by the output hotword detection model during training. In some examples, the output hotword detection model has fewer parameters than the input hotword detection model.

In some examples, the output hotword detection model and the input hotword detection model operate in parallel. In some examples, the input hotword detection model generates the separate hotword score after the determining that the output audio data includes the representation of the hotword. In some examples, blocking, by the processing module, use of the input audio data to initiate a command includes blocking the command from being executed. In some examples, blocking, by the processing module, use of the input audio data to initiate a command includes disabling the input hotword detection model to prevent the processing module from detecting a hotword. In some examples, blocking, by the processing module, use of the input audio data to initiate a command includes preventing the device from performing a local action. In some examples, blocking, by the processing module, use of the input audio data to initiate a command includes preventing the device from transmitting the input audio data as a command to a remote server. In some examples, blocking, by the processing module, use of the input audio data to initiate a command includes ignoring, by the input hotword model, the input audio data. In some examples, the method includes outputting, by the processing module, data indicating that the device has been comprised.

In some examples, the processing module includes a hotword detection model that receives audio data and determines that the received audio data includes a representation of a hotword, wherein the hotword detection model performs operations including generating a hotword score for the output audio data, comparing the hotword score to a predetermined threshold, determining, based on the comparing, that the output audio includes a representation of a hotword, generating, after the determining that the output audio data includes the representation of the hotword, a separate hotword score for the output audio data, comparing the separate hotword score to a separate predetermined threshold, confirming, based on the comparing, that the output audio data includes a representation of a hotword, and, based on the confirming that the output audio data includes the representation of the hotword, blocking, by the processing module, use of the input audio data to initiate a command.

In another general aspect, a device includes a self-contained secure processing module and one or more storage devices storing instructions that are operable, when executed by the one or more computers, to cause the self-contained secure processing module to perform operations. These operations include receiving, at the self-contained secure processing module of the device, output audio data that represents audio output by the device, receiving, by the self-contained secure processing module, input audio data that represents audio detected by a microphone, determining, by the self-contained secure processing module, that the output audio data includes a representation of a hotword, wherein the hotword is a word or phrase previously designated to precede a voice command, and, based on determining that the output audio data includes the representation of the hotword, blocking, by the self-contained secure processing module, use of the input audio data to initiate a command.

In another general aspect, a computer-readable storage device stores software including instructions executable by one or more computers which, upon such execution, cause the one or more computers to perform operations. These operations include receiving, at a processing module of a device, output audio data that represents audio output by the device, receiving, by the processing module, input audio data that represents audio detected by a microphone, determining, by the processing module, that the output audio data includes a representation of a hotword, wherein the hotword is a word or phrase previously designated to precede a voice command, and, based on determining that the output audio data includes the representation of the hotword, blocking, by the processing module, use of the input audio data to initiate a command.

In another general aspect, a method of controlling the use of hotwords in triggering automatic processing of a speech command which follows such a hotword includes using a microphone to generate a first audio signal comprising speech, receiving a second audio signal tapped from an input to a loudspeaker concurrently with the first audio signal being generated using the microphone, detecting the hotword as present in the first audio signal; detecting the hotword as present in the first audio signal, detecting the hotword as absent in the second audio signal concurrent to the detected hotword in the first audio signal, and executing a speech command which follows the hotword in the first audio signal responsive to the detection of the hotword as present in the first audio signal only if the hotword is detected as absent in the second audio signal.

In one general aspect, a method is performed by computing devices, and includes receiving, by the one or more computing devices, a first message indicating that an improper voice command has been detected by a first device, identifying, by the one or more computing devices, a user account associated with the first device based on the first message, identifying, by the one or more computing devices, a second device associated with the user account, and, in response to receiving the first message indicating that the voice command detected by the first device is improper, sending, by the one or more computing devices, a second message to the second device, the second message indicating that the voice command should not be performed.

Implementations may include one or more of the following features. For example, the first message may indicate that the improper voice command was falsified. In some examples, the first message indicates that the first device output the falsified command. In some examples, the second message to the second device prevents execution of the improper voice command. In some examples, the method includes determining, by the one or more computing devices, a location of the first device based on at least one of: device registration data previously stored by a remote server, network connectivity data, or location data sent by the first device, and identifying, by the one or more computing devices and based on the location of the first device, the second device.

In some examples, the method includes determining, by the one or more computing devices, a set of multiple devices associated with the user account based on at least one of: a location of each device of the set of the multiple devices, a label generated by a user of the user account, or a grouping generated by the user, and sending, by the one or more computing devices, a third message to each device of the set of multiple devices. In some examples, the set of multiple devices associated with the user account is a proper subset of the multiple devices associated with the user account, and wherein each device of the set of multiple devices is selected for inclusion in the set of multiple devices based on at least one of: a location of each device of the set of the multiple devices, a label generated by a user of the user account, or a grouping generated by the user. In some examples, the method includes determining, by the one or more computing devices, a location of the first device based on at least one of: device registration data previously stored by a remote server, network connectivity data, or location data sent by the first device, identifying, by the one or more computing devices and based on the location of the first device, a set of multiple devices associated with the user account, each device of the set of multiple devices having a location within a maximum distance of the location of the first device, and sending, by the one or more computing devices, a third message to each device of the set of multiple devices, the third message indicating that the voice command should not be performed. In some examples, the third message is sent to each device of the set of multiple devices without receiving a fourth message from at least one device of the set of multiple devices, the fourth message indicating that the at least one device received the voice command. In some examples, the method includes sending, by the one or more computing devices and in response to receiving the first message, a third message to the first device acknowledging receipt of the first message, wherein the first message was sent by the first device over a network to a server system comprising the one or more computing devices.

In some examples, the method includes receiving, by the one or more computing devices, audio data for a voice command detected by the second device, determining, by the one or more computing devices, that the audio data for the voice command detected by the second device corresponds to audio data for the improper voice command detected by the first device, and, in response to determining that the audio data for the voice command detected by the second device corresponds to the audio data for the improper voice command detected by the first device, not executing the voice command detected by the second device. In some examples, determining that the audio data for the voice command detected by the second device corresponds to the audio data for the improper voice command detected by the first device includes determining, by the one or more computing devices, that the first message and the audio data for the voice command detected by the second device are associated with the user account associated with the first device. In some examples, determining that the audio data for the voice command detected by the second device corresponds to the audio data for the improper voice command detected by the first device includes determining, by the one or more computing devices, that a first time at which the audio data for the improper voice command detected by the first device was detected and a second time at which the audio data for the voice command detected by the second device was detected are within a certain period of time. In some examples, determining that the audio data for the voice command detected by the second device corresponds to the audio data for the improper voice command detected by the first device includes determining, by the one or more computing devices, that the audio data for the voice command detected by the second device and the audio data for the improper voice command detected by the first device have a minimum level of similarity. In some examples, determining that the audio data for the voice command detected by the second device corresponds to the audio data for the improper voice command detected by the first device includes determining, by the one or more computing devices, that the audio data for the voice command detected by the second device and the audio data for the improper voice command detected by the first device request a same type of action. In some examples, determining that the audio data for the voice command detected by the second device corresponds to the audio data for the improper voice command detected by the first device includes performing, by the one or more computing devices, automatic speech recognition on the audio data for the voice command detected by the second device to generate a first processed audio segment, performing, by the one or more computing devices, automatic speech recognition on the audio data for the improper voice command detected by the first device to generate a second processed audio segment, and determining, by the one or more computing devices, that the first processed audio segment and the second processed audio segment have a minimum level of similarity.

In some examples, the method includes sending, by the one or more computing devices, a third message to a mobile device of a user of the user account. In some examples, the method includes preventing, by the one or more computing devices, voice commands from being executed for a period of time after receiving the first message in response to receiving the first message.

In another general aspect, a system includes a first device, a second device, and a remote server that includes one or more computers and is connected to the first device and the second device over a network. The remote server may perform operations including receiving, by the one or more computers, a first message indicating that an improper voice command has been detected by a first device, determining, by the one or more computers, a user account associated with the first device based on the first message, identifying, by the one or more computers, a second device associated with the user account, and, in response to receiving the first message indicating that the voice command detected by the first device is improper, sending, by the one or more computers, a second message to the second device, the second message indicating that the voice command should not be performed.

In another general aspect, a computer-readable storage device stores software including instructions executable by one or more computers which, upon such execution, cause the one or more computers to perform operations. The operations include receiving, by the one or more computers, a first message indicating that an improper voice command has been detected by a first device, determining, by the one or more computers, a user account associated with the first device based on the first message, identifying, by the one or more computers, a second device associated with the user account, and, in response to receiving the first message indicating that the voice command detected by the first device is improper, sending, by the one or more computers, a second message to the second device, the second message indicating that the voice command should not be performed.

The subject matter described in this specification can be implemented in particular embodiments so as to realize one or more of the following advantages. For example, the security of devices can be enhanced by reducing the risk of fraudulent voice commands being acted on. Rather than relying on acoustic noise-cancelling to reduce audio attack risks, the disclosed techniques actively detect fraudulent instances of hotwords and prevent execution of commands given after the fraudulent hotwords. The security of a voice command system can be improved by suitable detection and filter control of potential attacker commands.

Additionally, the techniques can be used to identify when a device has likely been compromised. With this knowledge, protective measures can be taken. For example, at a server, the level of trust, permission, or access for the device may be reduced. Other measures can be taken, for example, voice commands for the device may be blocked until the device receives a security update. In some instances, the server may be able to block execution of sensitive commands, stop taking commands entirely, or take other preemptive measures to further reduce risk.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
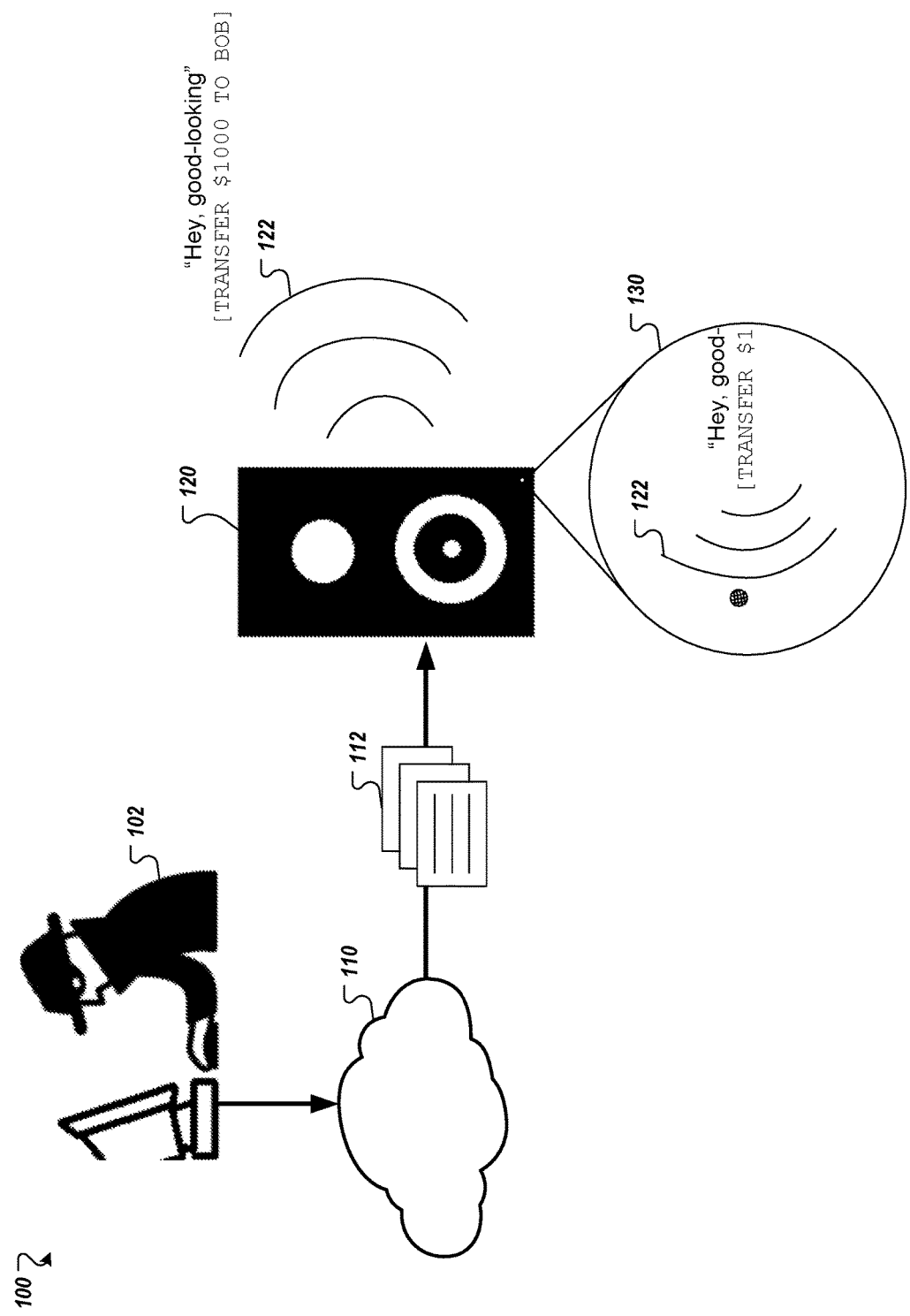
FIG. 1 is an illustration of an example process for preventing audio attacks.

In some implementations, an Internet-connected device, or host device, such as a smartphone or a smart thermostat, includes a separate hardware module that receives and processes voice commands for the host device. This hardware module is referred to herein as a voice assistance module, or VAM. The VAM may use one or more audio processing models to process received raw audio data from a microphone of the host device. For example, the VAM may use a model to detect hotwords that precede audio intended as a voice command. In some examples, hotwords are used to authenticate voice commands. For example, a host device may only act on a voice command if a particular hotword is provided prior to a user issuing the command.

In addition, the VAM may prevent audio attacks by using one or more audio processing models to analyze audio data representing the output from a speaker of the host device. For example, the VAM may include an eraser hotword model that analyzes audio output data or audio signals that a device provides to a speaker device. The eraser hotword model may be separate from the hotword recognition model used to detect valid hotwords detected in input audio data detected by a microphone. The eraser hotword model may be used to detect that a hotword and a subsequent command were output from the speaker of the host device, and so are a fraudulent hotword and command, e.g., which do not represent a valid hotword and command spoken by a user. For example, a malicious person may remotely gain access to the host device's control system and cause the host device to play audio of a recognized hotword and a command, e.g., unlocking the front door, wiring money to a specific account, etc. These attacks using an Internet-connected device can be particularly damaging, because the effects of the commands are not limited to the device itself. For example, such devices often have access to personal and private information about the authorized user's life, and voice commands may allow for actions for various user accounts and financial accounts. For example, authorized users may connect their energy meter to their bank account for billing purposes. If compromised, the authorized user's energy meter may provide a malicious person or program with access to the authorized user's bank account information the ability to make unauthorized charges.

The VAM may detect when a hotword and command are being output from the speaker of the host device, and determine that the hotword and command are fraudulent. The VAM then blocks the fraudulent hotword from being recognized or acted upon. For example, the VAM may disable or override the audio processing models used to detect hotwords in audio data received through the microphone of the host device. In some examples, the VAM prevents the command from being acted on by the host device. For example, the VAM may provide the audio data to the host device's control system and flag the audio data as malicious. The VAM may encrypt the processed audio data and provide the encrypted data to the host device's control system.

FIG. 1 shows an illustration of an example process 100 in which an audio attack is prevented. A bad actor 102 may access a compromised portion of a host device 120. The bad actor 102 may be a malicious person, harmful software, etc. Various bad actors may be used in addition or as an alternative. For example, a hacker may gain access to the host device 120 and work in parallel with a virus to perform an attack on the host device 120. The host device 120 is an Internet-connected device associated with one or more authorized users. The host device 120 is capable of receiving and executing voice commands. The host device 120 may be any of various devices, such as an appliance, toy, mobile device, stationary or fixed-location device. In this particular example, the host device 120 is a speaker. The host device 120 includes a microphone that receives audio data input and speakers that output audio data.

The bad actor 102 may access the compromised portion of the host device 120 through a network 110. The network 110 may be a local area network (LAN), a wide area network (WAN), the Internet, or a combination thereof. The network 110 may be used by the bad actor 102 to access the host device 120. The network may include 802.11 "Wi-Fi" wireless Ethernet (e.g., using low-power Wi-Fi chipsets), Bluetooth, networks that operate over AC wiring, or Category 5 (CAT5) or Category 6 (CAT6) wired Ethernet network. In some examples, the network 220 may be a mesh network constructed based on the devices connected to the mesh network.

The bad actor 102 may issue a command or data 112 indicating an action to be taken by the host device 120. For example, the data 112 may include a command to output a hotword recognized by the host device 120 and a command through a speaker of the host device 120. In some examples, the data 112 includes raw audio data to be output through the speaker of the host device 120. The raw audio data can be transmitted in various formats, including analog data, digital data, waveforms, etc. A hotword is a predetermined word or phrase that has been designated to signal the beginning of a voice query or voice command that immediately follows the hotword. The hotword can be a word or a phrase. In some examples, the hotword may be selected or changed by an authorized user. For example, an authorized user may set a custom hotword for each of their devices.

Transmitting the data 112 is one method of carrying out an audio attack. For example, the command following the recognized hotword may be a command to carry out a harmful action, such as unlocking the front door of an authorized user of the host device, disabling a security system in the authorized user's home, releasing the authorized user's passwords to the bad actor 102, etc. In this particular example, the command is to transfer $1000 to the bad actor 102 Bob.

The host device 120 may receive the data 112 and execute the command. For example, the host device 120 may output audio 122 that includes a recognized hotword followed by a command selected by the bad actor 102. In this particular example, the hotword is the phrase "Hey, good-looking," and the command is to transfer $1000 to a person named Bob. In a close-up view 130 of a microphone of the host device 120, the output audio 122 from the speaker of the host device 120 is detected by the microphone of the host device 120. Raw audio data from the microphone of the host device 120 is provided to a separate VAM integrated with the host device 120 and processed to detect and prevent the audio attack from being successfully carried out.

Figure 2:
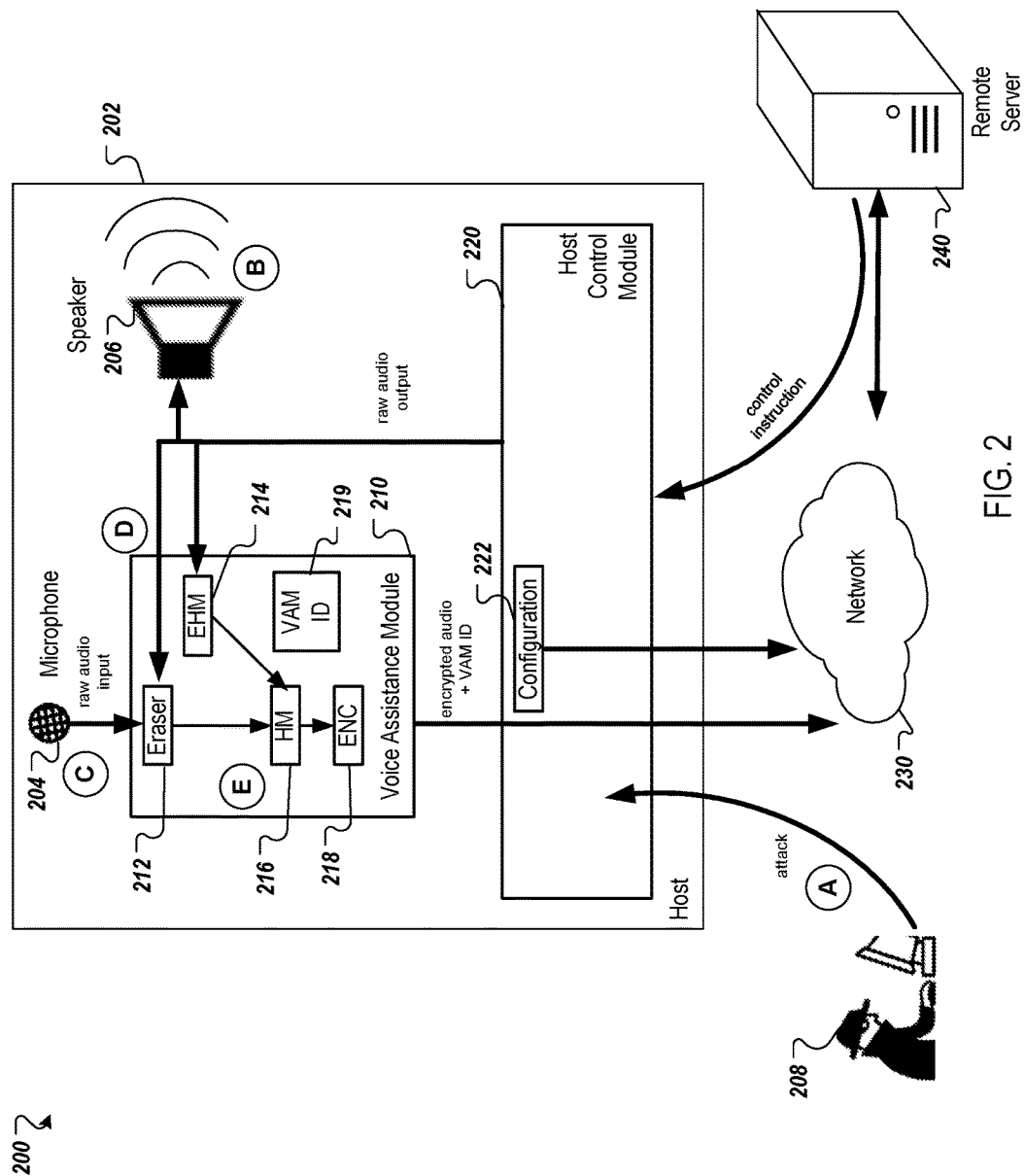
FIG. 2 is a block diagram of an example device including an audio attack prevention system.

FIG. 2 illustrates a system diagram of an example audio attack prevention system 200. The system 200 includes a host device 202, a network 230, and a remote server 240. A bad actor 208 accesses a compromised portion of the host device 202. The bad actor 208 may be similar to the bad actor 102 as described above with respect to FIG. 1. The host device 202 may be an implementation of the host device 120 as described above with respect to FIG. 1. The host device 202 includes a microphone 204, a speaker 206, a voice assistance module, or VAM, 210, and a host control module 220.

The microphone 204 receives raw input audio. The raw input audio could be in any of several formats, including analog, digital, compressed, waveform, extracted features, etc. The microphone 204 is a sensor that converts sound into an electrical signal, and can use any of various methods to convert the air pressure variations of a sound wave into an electric signal. For example, the microphone 204 may be a dynamic microphone that uses a coil of wire suspended in a magnetic field, a condenser microphone that uses a vibrating diaphragm as a capacitor plate, a piezoelectric microphone that uses piezoelectric materials, etc. In some examples, the microphone 204 is an integrated component of the host device 202. In some examples, the microphone 204 is an external microphone that is communicably connected to the host device 202. The microphone 204 may be connected to the host device 202 through various connections, including through a wired connection, a wireless connection, etc. For example, the microphone 204 may be a wired microphone that is plugged into the host device 202 through a 3.5 mm audio jack of the host device 202.

The speaker 206 outputs audio. The speaker 206 is a transducer that converts electrical signals into sound. The speaker 206 may receive commands to output audio from the host control module 220. In some examples, the speaker 206 receives raw audio data which it converts into sound. The speaker 206 may use any of various methods to convert electrical signals into sound. In some examples, the speaker 206 uses the same basic principles as the microphone 204, in reverse. For example, the speaker 206 may be a dynamic speaker that applies an electrical signal to a coil of wire suspended in a magnetic field to cause a diaphragm to vibrate and produce sound. In some examples, the speaker 206 is an integrated component of the host device 202. In some examples, the speaker 206 is an external speaker that is communicably connected to the host device 202. The speaker 206 may be connected to the host device 202 through various connections, including a wired connection, a wireless connection, etc. For example, the speaker 206 may be a wireless speaker that is connected to the host device 202 via a Bluetooth connection.

The VAM 210 is a secured hardware module, separate from the host device 202, that is integrated with the host device 202. The VAM 210 includes an eraser 212, an eraser hotword model, or EHM, 214, a hotword model, or HM, 216, an encryption module 218, and a VAM ID 219. The VAM 210 may be an implementation of the VAM as described above. The VAM 210 may use audio processing models, e.g., the EHM 214 and/or the HM 216, to process received raw audio data from the microphone 204 by detecting hotwords that precede audio data to be processed as a voice command.

During standard operation, the VAM 210 receives raw audio data from the microphone 204 and performs eraser processing on the raw audio data to reduce noise and provide echo cancellation. The erased data is then sent to a hotword detection model that determines whether the erased data includes an instance of a hotword that indicates that the following audio data includes a command to be executed. When a hotword is detected, the VAM 210 encrypts the processed audio data and provides the encrypted data to the host control module 220. The host control module 220 provides the encrypted data to the remote server 240 over the network 230. Upon receiving the encrypted data, the remote server 240 detects a command in the received data and generates control instructions based on the detected command. The remote server 240 then provides the control instructions to the host device 202 through the network 230.

While the standard operation of the VAM 210 provides voice command and eraser functionality to the host device 202, the host device 202 is vulnerable to attacks from third parties, such as the bad actor 208. In some situations, the bad actor 208 may compromise the host control module 220 and perform an attack on the host device 202 by providing a command or raw audio data to be output from the speaker 206. In some examples, the bad actor 208 may gain access to the host control module 220 through the network 230, and perform the attack over the network 230. The attack may instruct the host control module 220 to output audio, including a hotword recognized by the VAM 210 and a command, through the speaker 206. The audio output by the speaker 206 is then picked up by the microphone 204, which provides the audio data to the VAM 210. During standard operation, the VAM 210 would detect the illicitly provided hotword as a recognized hotword, encrypt the audio data, and provide the encrypted data to the host control module 220. The host control module 220 would then provide the encrypted audio data to the remote server over the network 230, and the remote server 240 would generate control instructions for the host control module 220 or perform the command.

In order to prevent such attacks, the VAM 210 performs additional eraser processing using a hotword detection model, the EHM 214, separate from the hotword model HM 216. The process of preventing an audio attack is described with respect to stages (A)-(E) of FIG. 2.

During stage (A), the bad actor 208 performs the attack by providing data or a command to the host control module 220 through the network 230. In some examples, the attack may include raw data to be output by the speaker 206. For example, the attack may include raw audio data that, when output by the speaker 206, plays a spoken hotword recognized by the VAM 210 followed by a command. The host control module 220 may provide the raw audio data to the speaker 206 for output. In some examples, the data includes a command for the host control module 220 to process the data to generate raw audio data for output by the speaker 206. The host control module 220 also provides the raw audio data or the generated raw audio to the eraser 212 and the EHM 214 for eraser processing.

The process continues with stage (B), in which the speaker 206 outputs the raw data provided by the host control module 220. The output audio data is detected by the microphone 204 in stage (C). The microphone 204 provides the detected audio data as raw audio input to the eraser 212.

The eraser 212 provides features such as noise and echo cancellation. The eraser 212 attempts to cancel noise from the speaker 206 of the host device 202 received at the microphone 204. The eraser 212 may be implemented through software or hardware. For example, the eraser 212 may be a filtering circuit included in the VAM 210. In some examples, the eraser 212 may be a software module that processes audio input data. In some examples, the eraser 212 operates on the combination of the microphone input and the raw audio output. For example, the eraser 212 essentially subtracts the sound waves of the raw output at the speaker 206 from the input audio received through the microphone 204. The eraser 212 may process the audio data accounting for additional complexities, including timing and environmental factors. For example, the eraser 212 may account for delay between receiving input at the microphone 204 and providing output at the speaker 206 if the microphone 204 is placed physically apart from the speaker 206, or environmental factors, such as background noise from a refrigerator.

The eraser 212 receives the raw audio input in stage (C). The eraser also receives raw audio output provided to the speaker 206 for output. During stage (D) of the process for preventing audio attacks, the host control module 220 provides raw audio output to the eraser 212 and the EHM 214 for eraser processing. The eraser 212 performs noise and echo cancellation on the combination of raw audio input from the microphone 204 and raw audio output that is sent to the speaker 206. The eraser 212 provides the erased audio data to the HM 216.

During stages (D) and (E), the VAM 210 may prevent audio attacks by using separate audio processing models, e.g., the EHM 214 and the HM 216, that receive and process audio data directly from the speaker 206. During stage (D), the EHM 214 receives the raw audio data from the host control module 220 and may detect that a hotword and a command being played from the speaker 206 are fraudulent.

During stage (E), the HM 216 receives the erased audio input data from the eraser 212, and may detect a hotword in the erased audio input data. In some examples, stages (D) and (E) occur sequentially. In such examples, if, during stage (D), the EHM 214 detects a fraudulent hotword in the raw audio output, the EHM 214 may disable the HM 216 during stage (E) to prevent the HM 216 from detecting the hotword. In some examples, stages (D) and (E) occur in parallel. In such examples, if, during stage (D), the EHM 214 detects a fraudulent hotword in the raw audio output, the EHM 214 may transmit a message to the host control module 220 and/or the remote server 240 that the hotword detected by the HM 216 is fraudulent. In some examples, if no hotword is detected by the HM 216, the EHM 214 takes no action.

The two hotword detection models of the VAM—an input HDM, e.g., the HM 216, and an output HDM, e.g., the EHM 214—operate in parallel. In some examples, the hotword detection models operate sequentially. In some examples, the EHM 214 and the HM 216 are machine learning models. For example, the EHM 214 and the HM 216 may be neural networks which accept audio data as inputs. In some examples, the EHM 214 and the HM 216 may use any of a variety of models such as decision trees, linear regression, neural networks, Bayesian networks, etc., and can be trained using a variety of approaches, such as deep learning, inductive logic, support vector machines, clustering, etc.

In some examples, the EHM 214 and the HM 216 are the same neural networks, and are biased during training. For example, the EHM 214 may be tuned to detect fewer fraudulent negatives of hotwords. In other words, the EHM 214 may be biased during training to be more accepting of audio input as including a hotword and require less certainty before determining that the input includes the hotword. For example, the EHM 214 may have 50% confidence that the received input includes a hotword when making the determination that the input includes the hotword, while the HM 216 may have an 80% confidence before making the same determination.

Biasing during training may be controlled through the selection of parameters used in training. The parameters used in the EHM 214 and the HM 216 may be defined through software or hardware. For example, the parameters used may be defined through software. The parameters used for the models 214 and 216 may be stored with the models within a memory of the VAM 210. In some examples, updates to the models 214 and 216 may be done through a firmware update. In some examples, the parameters are defined in the silicon for the models 214 and 216, and can be changed only by replacing the hardware defining the models 214 and 216.

In some examples, the EHM 214 is a smaller model than the HM 216. For example, the EHM 214 may include fewer parameters than the HM 216. In such an instance, the EHM 214 may be faster than the HM 216, because the EHM 214 has fewer parameters to process in its neural network. The EHM 214 may have fewer layers than the HM 216, allowing the EDM 214 to generate an output faster than the HM 216. In some examples, the EHM 214 has fewer nodes overall than the HM 216. The EHM 214 may be computationally more efficient due to having fewer layers and/or nodes. The size of a model may be determined during training of the model.

In some examples, the EHM 214 and the HDM 216 may be implemented using a single hotword detection model that alternates processing. For example, the single hotword detection model may alternate between processing audio data received at the microphone 204 and processing audio data output at the speaker 206. In some examples, the single hotword detection model may be run with different parameters for the different audio data. For example, the single hotword detection model may be run with more layers for the audio data input at the microphone 204.

The EHM 214 and the HM 216 determine that the respective audio data includes a hotword by generating a score using trained neural networks and checking the score against a threshold. In some examples, the threshold is determined by an authorized user of the host device 202. In some examples, the threshold is determined by the remote server 240 and communicated to the EHM 214 and the HM 216 through the network 230. In some examples, the threshold is determined by the host control module 220. The threshold may be determined by the host device 202 based on historical hotword detection data at the host device 202. The threshold may be determined in various other ways, such as using a separate audio processing model, using default values determined by a manufacturer of the host device 202 or the VAM 210, etc.

The EHM 214 may receive output audio in any of various ways. In some examples, the EHM 214 may receive output audio by tapping into an analog output to the speaker 206. The VAM 210 would then include an analog to digital converter through which the data is passed before being processed by the EHM 214. In some examples, the EHM 214 receives digital data representing the output to the speaker 206. For example, the EHM 214 may receive digital data from the host control module 220 or over the network 230 representing the output to the speaker 206.

The HM 216 may receive input audio in any of various ways. In some examples, the HM 216 receives raw input audio data directly from the microphone 204. In some examples, the HM 216 receives digital data representing the input received at the microphone 204. For example, the HM 216 may receive digital data from the host control module 220. In some examples, the HM 216 receives erased audio input from the eraser 212.

As described above, the EHM 214 and the HM 216 may be operated in parallel or sequentially. In some examples, the EHM 214 and the HM 216 are operated in parallel, reducing latency in producing outputs and determining, by the VAM, that a fraudulent hotword has been detected from the speaker 206. In some examples, the EHM 214 and the HM 216 are operated sequentially, and the VAM 210 uses HM 216 to confirm the output of the EHM 214. In such examples, security is improved by providing a second layer of protection through requiring confirmation. If the EHM 214 detects a hotword in the output from the speaker 206, the HM 216 may verify that there is a hotword in the input from the microphone 204 and block the following command. If the EHM 214 detects a hotword in the output from the speaker 206 and the HM 216 does not detect a hotword, the EHM 214 may conserve computing resources by not taking action to block the input audio. In such examples, the VAM 210 may resume normal operation. In some examples, the HM 216 will not detect a hotword if the EHM 214 does not detect a hotword, because the EHM 214 is more accepting of hotwords.

The VAM 210 may encrypt the audio data using the encryption module 218 and provide the encrypted data to the host control module 220. The encryption module 218 encrypts audio data processed by the VAM 210. For example, the encryption module 218 may apply an algorithm to the audio data to generate data that can only be read if decrypted. The encryption module 218 may use one or more of various types of encryption, such as symmetric key or public-key encryption. For example, the encryption module 218 may use a symmetric encryption algorithm such as the Advanced Encryption Standard (AES). The encryption module 218 may use any of various techniques, such as RSA, YAK, S/MIME, SSH, etc.

The VAM ID 219 identifies the specific VAM 210. In some examples, the VAM ID 219 identifies the authorized user associated with the host device 202. In some examples, the VAM ID 219 is an alpha-numeric identification code. The VAM ID 219 may include various other characters, including ASCII characters, Unicode characters, etc. In some examples, the VAM ID 219 is a header included with all data processed by the VAM 210. The VAM ID 219 may automatically be transmitted with data processed by the VAM 210. In some examples, the VAM ID 219 is transmitted when it has been requested. For example, if the remote server 240 requests the VAM ID 219 from the host device 202, the VAM 210 may transmit the VAM ID 219 to the remote server 240 through the network 230.

The VAM 210 may include a communication module or a data connection through which the VAM 210 transmits the processed, encrypted audio data. The VAM 210 provides the encrypted audio data to the host control module 220. In some examples, VAM 210 bypasses the host control module 220 and provides the encrypted audio data to the network 230 for transmission to the remote server 240.

The host control module 220 controls the host device 202. The host control module 220 includes a configuration 222. The host control module 220 may be a processor that receives encrypted audio data from the VAM 210 and detects a command to be executed. For example, the VAM 210 may transmit the processed, encrypted audio data, including an identified command, to the host control module 220. The host control module 220 may detect the command, and based on the configuration 222, execute a command.

In some examples, the host control module 220 passes the encrypted audio data to the remote server 240 over the network 230. In some examples and receives a control instruction. For example, the host control module 220 may transmit the encrypted audio data to the remote server 240 to process and detect the command. The remote server 240 may then provide a control instruction specifically for the host device 202 to the host control module 220 over the network 230.

In some examples, the command is issued directly from the bad actor 208 over the network 230 to the host control module 220. For example, the command may be to provide the bad actor 208 with all of an authorized user's contacts. The host control module 220 may transmit the command to the remote server 240, and the remote server 240 may issue a control instruction to the host control module 220 to output audio at the speaker 206. In some examples, the remote server 240 may directly transmit audio data to be output at the speaker 206. The audio data to be output may be tapped and fed into the eraser 212 and passed to the EHM 214 for processing and detection of fraudulent hotwords.

In some examples, the command includes requires connection or control over devices other than the host device 202. For example, the bad actor 208 may issue a command, or attack, over the network 230 to unlock the front door of the authorized user's house. In this particular example, the front door is the device that must be acted on. The host device 202 may transmit the command to the remote server 240 through the network 230 for processing and/or distribution. For example, the host device 202 may transmit the command to the remote server 240 to transmit to the front door.

The configuration 222 defines a configuration of the host control module 220 and the host device 202. In some examples, the configuration 222 is stored in a memory of the host control module 220. In some examples, the configuration 222 is stored in the remote server 240. In some examples, the configuration 222 includes authorized user data. For example, the configuration 222 can maintain a list of users and the commands they are authorized to issue. In some examples, the configuration 222 includes operational data. For example, the configuration 222 may define the actions to be taken by the host control module 220 in specific situations. In some examples, the configuration 222 defines actions to be taken by the host control module 220 under standard operation. For example, the configuration 222 may define valid commands to be provided to the host control module 220 or authorized users who may provide commands to the host control module 220. In some examples, the host control module 220 uses the configuration 222 to determine what data to transmit to the server 240.

In some examples, the configuration 222 may be updated. In some examples, an authorized user can update the configuration. In some examples, a manufacturer of the host device 202 can issue an update to the configuration 222. In some examples, the configuration 222 may be automatically updated. For example, the configuration 222 may be automatically updated based on historical data collected by the remote server 240. In some examples, the configuration 222 may be updated by receiving data from the remote server 240 through the network 230. The configuration 222 may be implemented as software or hardware. For example, the configuration 222 may be maintained as a file, document, etc. in a memory of the host control module 222. In some examples, the configuration 222 may be maintained as a hardware circuit of the host control module. For example, the configuration 222 may be determined by a set of switches on the host control module 222.

In some examples, the configuration 222 is associated with the VAM ID 219. For example, a particular configuration 222 may be mapped to a particular VAM ID 219 in the remote server 240.

The example audio attack prevention system 200 includes the network 230. The network 230 may be similar to the network 110 as described above with respect to FIG. 1. The network 230 connects the host device 202 with the remote server 240. The bad actor 208 can access the host device through the network 230 to provide fraudulent and/or unauthorized commands.

The remote server 240 receives and processes commands from the network 230. In some examples, the remote server 240 receives and processes commands received from the network 230 and from one or more host devices 202. For example, the remote server 240 may be a dedicated server that receives and processes commands for all host devices 202 that include a VAM 210. The remote server 240 may determine that a host device 202 includes a VAM 210 in any of various methods. For example, the remote server 240 may determine, from a command received over the network 230 from the host device 202 that a VAM ID 219 was included. In some examples, the remote server 240 receives and processes voice commands from various different devices.

The remote server 240 can process commands in several ways, including blocking a command, executing a command, forwarding a command, etc. For example, the remote server 240 may receive data from the host device 202 that an attack was detected in a particular audio input, and block the command accompanying the input. In some examples, the remote server 240 may forward a command to a different host device 202. For example, if a command to turn on a fan above the stove top of an authorized user's kitchen is received from a refrigerator in the authorized user's kitchen, the remote server 240 may forward the command received over the network 230 to the fan.

The remote server 240 can perform time synchronization across commands received to ensure that commands received are blocked, executed, delayed, forwarded, etc., and associated with the correct audio data. For example, the remote server 240 may receive a command indicating that audio input received at 1304 EST included a fraudulent hotword. In this particular situation, the remote server 240 may process each command to determine a time stamp of the accompanying audio data. Then, the remote server 240 may process the command and the associated audio data. The remote server 240 may determine a time of receipt of a command with a time that the hotword was detected to determine that the correct action is being taken. For example, the remote server 240 may determine that a proper command was received 1140 PST and determine that the associated audio data, including the authenticated hotword, was received at 1139 PST.

Figure 3:
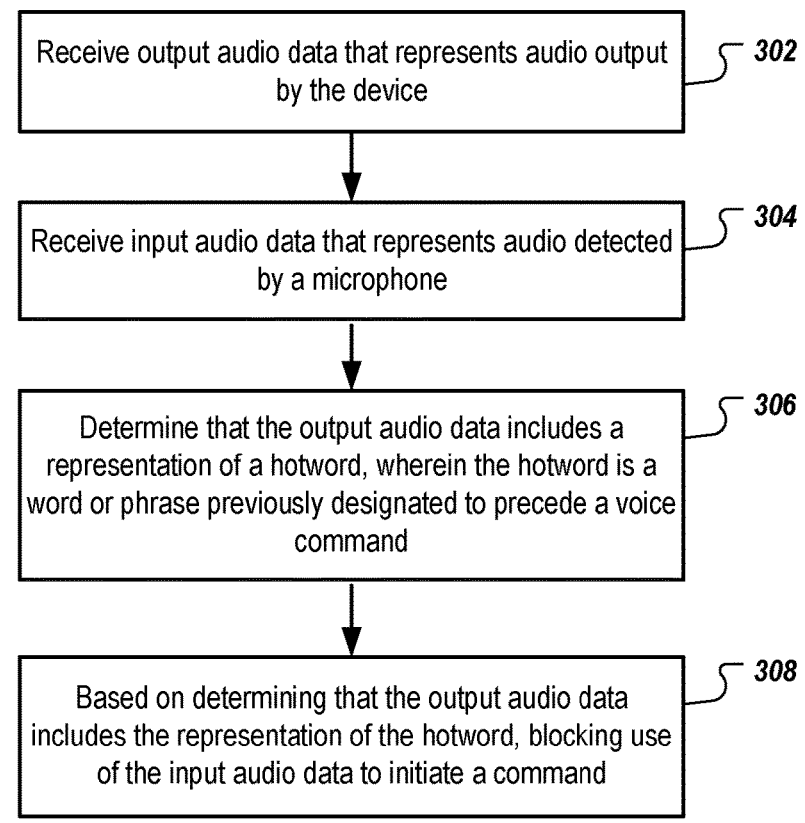
FIGS. 3 and 5 are flow diagrams that illustrate example processes for preventing an audio attack.

FIG. 3 is a flowchart of an example process 300 for preventing an audio attack. The process 300 may be performed by a system such as the audio attack prevention system 200.

A voice control module receives output audio data that represents audio output by the device (302). For example, referring to FIG. 2, the VAM 210 may receive output audio data that represents audio output at the speaker 206 of the host device 202. Assume, for this particular example, that the host device 202 is an Internet-connected pancake iron.

The voice control module receives input audio data that represents audio detected by a microphone (304). For example, the VAM 210 may receive input audio data that represents audio detected at the microphone 204 of the pancake iron 202. In this particular example, the input audio data may include a command to wire money to a person named Joe.

The voice control module determines that the output audio data includes a representation of a hotword, wherein the hotword is a word or phrase previously designated to precede a voice command (306). For example, the VAM 210 may determine that the output audio data includes a hotword, "Pancake Sunday," that was set by the manufacturer of the pancake iron 202.

Based on determining that the output audio data includes the representation of the hotword, the voice control module blocks use of the input audio data to initiate a command (308). For example, the VAM 210 may determine that the output audio data includes the instance of "Pancake Sunday," and because the audio data is output from the speaker 206 of the pancake iron 202, the VAM 210 may determine that the audio data is fraudulent. The VAM 210 may then block the use of the input audio data received at the microphone 204 from being used to initiate the command to wire money to Joe.

The VAM 210 may block the use of input audio to initiate the command in various ways. For example, the VAM 210 may disable the HM 216 to prevent the hotword from being recognized. The VAM 210 may send data to the remote server 240 over the network 230 indicating that a fraudulent hotword was detected in audio data output from the speaker 206, and that audio data input at the microphone 204 corresponding to the audio data output should not be acted upon. In some examples, the VAM 210 transmits the encrypted audio data, including the command, along with the VAM ID 219 to identify which host device 202 has been compromised.

Figure 4A:
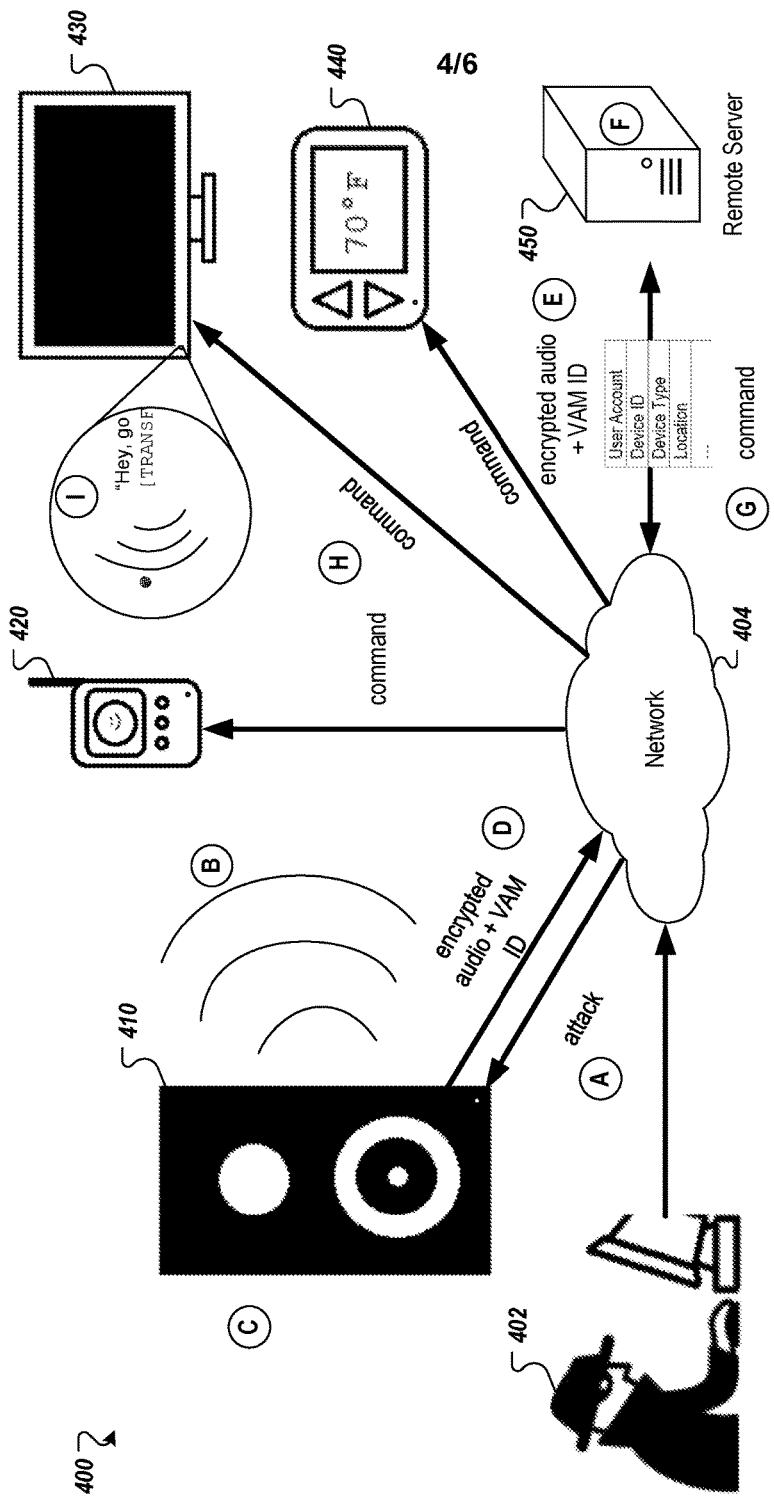
FIGS. 4A-4B are system diagrams that illustrate example processes for preventing an audio attack.

FIG. 4A is a system diagram that illustrates an example of a process 400 for preventing an audio attack. The process 400 may be performed by a system such as the audio attack prevention system 200. In the process 400, multiple host devices are connected to a remote server and are vulnerable to being compromised by picking up a fraudulent command issued from a speaker of a different host device.

The process 400 spans stages (A) through (H). Stages (A) to (H) may occur in the illustrated sequence, or they may occur in a suitable sequence that is different than in the illustrated sequence. In some examples, the process 400 is repeated. In some examples, only certain stages of the process 400 is repeated.

The process 400 includes a bad actor 402, a network 404, host devices 410, 420, 430, and 440, and a remote server 450. The bad actor 402 may be an implementation of the bad actor 208 as described above with respect to FIG. 2. The network 404 may be an implementation of the network 230 as described above with respect to FIG. 2. The host devices 410, 420, 430, and 440 may be implementations of host devices 202 as described above with respect to FIG. 2. In this particular example, the host device 410 is a speaker, the host device 420 is a baby monitor, the host device 430 is a television, and the host device 440 is a thermostat. Each of the host devices 410, 420, 430, and 440 includes a separate VAM. The host devices 410-440 may all be within the same physical location. In this particular example, the host devices 410-440 are located within an authorized user's home. In some examples, not all of the host devices 410-440 are located within the same location. The host devices 410-440 are associated with the same authorized user. In some examples, the authorized user has a user account corresponding to each of the VAMs integrated with the host devices 410-440. The remote server 450 may be an implementation of the remote server 240 as described above with respect to FIG. 2.

The process 400 begins with stage (A), in which the bad actor 402 issues an attack over the network 404 to the host device 410. In this particular example, the attack includes a command to output the hotword phrase "Hey, good-looking" and a command to "TRANSFER $1000 TO BOB" over a speaker of the host device 410.

The process 400 continues with stage (B), in which the host device 410 outputs the hotword phrase and the command over its speaker. In some examples, the host device 410 is within microphone detection range of one or more other host devices. In this particular example, the host device 410 is within microphone pick-up range of the host device 430.

The process 400 continues with stage (C), in which the host device 410 processes the audio data output from its speaker. The host device 410 may process the audio data as described above with respect to FIGS. 2 and 3. For example, the host device 410 may determine, using an eraser hotword model and a separate hotword model, that the audio data output from its speaker includes the hotword "Hey, good-looking," and that the command following the hotword should not be executed.

The process 400 continues with stage (D), in which encrypted audio data and a VAM ID of the VAM of the host device 410 is transmitted from the host device 410 to the network 404. In this particular example, the encrypted audio data may include an indication that the hotword received was output from its speaker, and that the accompanying command is fraudulent and should not be executed. The encrypted audio data may include information such as a time stamp of when the hotword occurred, the duration of the output audio data, the raw audio data, etc. In some examples, the raw audio data is provided in the encrypted audio data to allow the remote server 450 to pinpoint the fraudulent command and store the command for future reference. The indication may be provided by a host control module of the host device 410.

The process 400 continues with stage (E), in which the encrypted audio data and the VAM ID are transmitted to the remote server 450 over the network 404. The remote server 450 receives the encrypted audio data and the VAM ID and the process 400 continues with stage (F).

During stage (F), the remote server 450 processes the received encrypted audio data and VAM ID. The remote server 450 can determine, from the encrypted audio data and the VAM ID, the user account corresponding to the VAM of the host device 410. In some examples, the VAM ID indicates the user account. The remote server 450 can also determine, from the encrypted audio data and the VAM ID, that the output audio from the speaker of the host device 410 included a fraudulent hotword, and that the input audio detected at a microphone of the host device 410 should not be used to initiate the command TRANSFER $1000 TO BOB.

The process 400 continues with stage (G), in which the remote server 450 transmits a message to all at-risk host devices. In some examples, the message is transmitted a list of host devices filtered by location. For example, the message may be transmitted to only those devices that are within microphone detection range of the compromised host device 410. In some examples, the at-risk host devices have not detected the fraudulent command. In some examples, one or more of the at-risk host devices have detected the fraudulent command, and may begin processing the input audio.

The message may include any of various control instructions in response to detecting that the host device 410 was compromised. For example, the message may include a control instruction to block command processing for a certain period of time. For example, the message may instruct the at-risk host devices not to process commands for the next 30 seconds. In some examples, the message may include a control instruction to change a status of the at-risk host devices. For example, the message may instruct the at-risk host devices to enter a high-alert status that may alter the configuration of each of the host devices. In some examples, the message may adjust parameters of the separate hotword detection models of each of the at-risk host devices. For example, the message may include altered parameters for the eraser hotword model and the hotword model of each of the at-risk host devices. In some examples, the altered parameters are customized for each host device. In some examples, the altered parameters are uniform across the at-risk host devices.

In some examples, the message includes a control instruction to deny the fraudulent command. For example, the message may include the audio data for the fraudulent command and an instruction to block the command from being issued. In some examples, the message may include the hotword and the time stamp for when the hotword occurred so that the VAMs of the at-risk devices can determine which instance or instances of the hotword to ignore. In some examples, the message indicates that an attack has occurred. In some examples, an acknowledgement message may be transmitted to the VAM of the compromised host device. For example, a message from the remote server 450 acknowledging the receipt of the encrypted audio data and VAM ID may be transmitted back to the host device 410 over the network 404.

The message may be transmitted from the remote server 450 through the network 404 to each of the VAMs of the at-risk host devices. In some examples, the message is transmitted to each of the host control modules of the at-risk host devices.

In some examples, the remote server 450 may transmit a message to the authorized user. For example, the remote server 450 may transmit a message to the authorized user's mobile device indicating that a fraudulent command has been issued. This allows the authorized user to take action to prevent audio attacks.

In some examples, the remote server 450 can determine a location of the compromised host device 410 and notify only those host devices that are within a range of the location. For example, the remote server 450 may determine the street address of the host device 410 and only notify host devices at the street address. In some examples, the remote server 450 may determine the location of the host device 410 to room-level detail. For example, the remote server 450 may determine that the host device is in the living room of the authorized user's home.

In some examples, the remote server 450 may determine the location of the host device 410 through the encrypted audio data and VAM ID received in stage (E). For example, the VAM ID may include location data. In some examples, the remote server 450 may access stored host device data. For example, the host devices may have been set-up through a registration process in which information such as the user account, device ID, device type, location, VAM ID, etc. is entered and stored. The remote server 450 may determine host device information through various methods. For example, the remote server 450 may obtain network connectivity data indicating a location of a host device by communicating with a router. In some examples, the remote server 450 may access GPS data of the authorized user's mobile device at the time of installation of the host device. For example, the remote server 450 may determine that the authorized user's mobile device was within the authorized user's workshop when the host device 410 was set-up. In some examples, the remote server 450 determines host device location information through current or recent communications with other devices. For example, if the host device 410 recently communicated with a different host device registered by the authorized user as being in the kitchen of the authorized user's house, the remote server 450 may determine that the host device 410 is in the authorized user's kitchen. In some examples, host devices associated with the authorized user's account may be grouped based on certain attributes of the host devices. For example, all host devices that are located in the bedroom are labelled "Bedroom," and all cooking appliance host devices are labelled "Cooking." Host devices may have more than one label.

In some examples, more than one authorized user is within the same area, and multiple authorized user accounts are detected within that area. For example, Henry may have an authorized user account associated with four host devices, while Sarah may have an authorized user account associated with two host devices. Henry and Sarah are married and live in the same house. In such situations, if one of Sarah's devices is compromised, the remote server 450 may transmit a message only to Sarah's devices. In some examples, if Henry and Sarah have similar or identical hotwords, the remote server 450 may transmit a message to both Henry's and Sarah's host devices.

In some examples, the compromised host device 410 may transmit a local signal additionally, or in the alternative to, the message transmitted by the remote server 450. In such situations, the host device 410 may transmit the local signal using a local network or short-ranged communication protocol. For example, the host device 410 may use Bluetooth, ZigBee, a LAN, etc. In some examples, the host device 410 may transmit the local signal through a wired connection. In some examples, the host device 410 broadcasts a local warning signal if connections to the network 404 or any other network are down.

In some examples, the local signal is not encrypted. For example, the host device 410 may transmit certain unencrypted messages locally. In such situations, stages (D)-(H) must occur before stage (I). In some examples, the host device 410 determines whether to encrypt the local message based on certain parameters. For example, the host device 410 may not encrypt the local message for certain devices that are offline, or when the Internet connection is down.

The process 400 continues with stage (H), in which the at-risk host devices 420-440 receive the message. In some examples, stages (D)-(H) occur in parallel with stages (B)-(C), and before stage (I). In some examples, stage (H) occurs simultaneously or after stage (I).

The process 400 continues with stage (I), in which one or more of the host devices 420-440 detect the fraudulent command. In this particular example, the host device 430 detects the fraudulent command. If stage (H) has occurred before stage (I), the host device 430 will be prepared to receive a fraudulent command, and will not process the command. In some examples, if stage (H) occurs in parallel with or after stage (I), the host device 430 may halt processing or discard process so far.

If a host device's microphone picks up a fraudulent command issued from a second device, a separate hotword detection model alone would not be sufficient to prevent an attack. The hotword detection model that receives output audio data from the host device's own speaker would not detect that a hotword was output from the speaker. The process 400 provides an additional layer of security against audio attacks by alerting other host devices that a first host device has been compromised, and has issued a fraudulent command. The other host devices may then disregard audio data received matching the output audio from the speaker of the first host device.

By notifying the authorized user, the process 400 allows the authorized user to assist in preventing attacks. The authorized user, once aware of the attack, may be prompted to alter their security practices involving their Internet-connected devices. The authorized user may adjust the placement of their host devices, revise their hotword, update a configuration of one or more host devices, etc.

Transmitting a local signal reduces dependency on the availability and connection strength to a network. When using a wired connection, there is reduced risk of the fraudulent command being carried out even when networks are down. The local signal also offers protection for offline devices. In addition, using a local signal can reduce latency. For example, using a local signal reduces the distance that the signal must travel, and using a wired connection reduces the risk of dropped packets. Using a local signal may increase privacy by reducing the spread of the information. For example, if using a secure local network, the signal does not leave the local area.

Figure 4B:
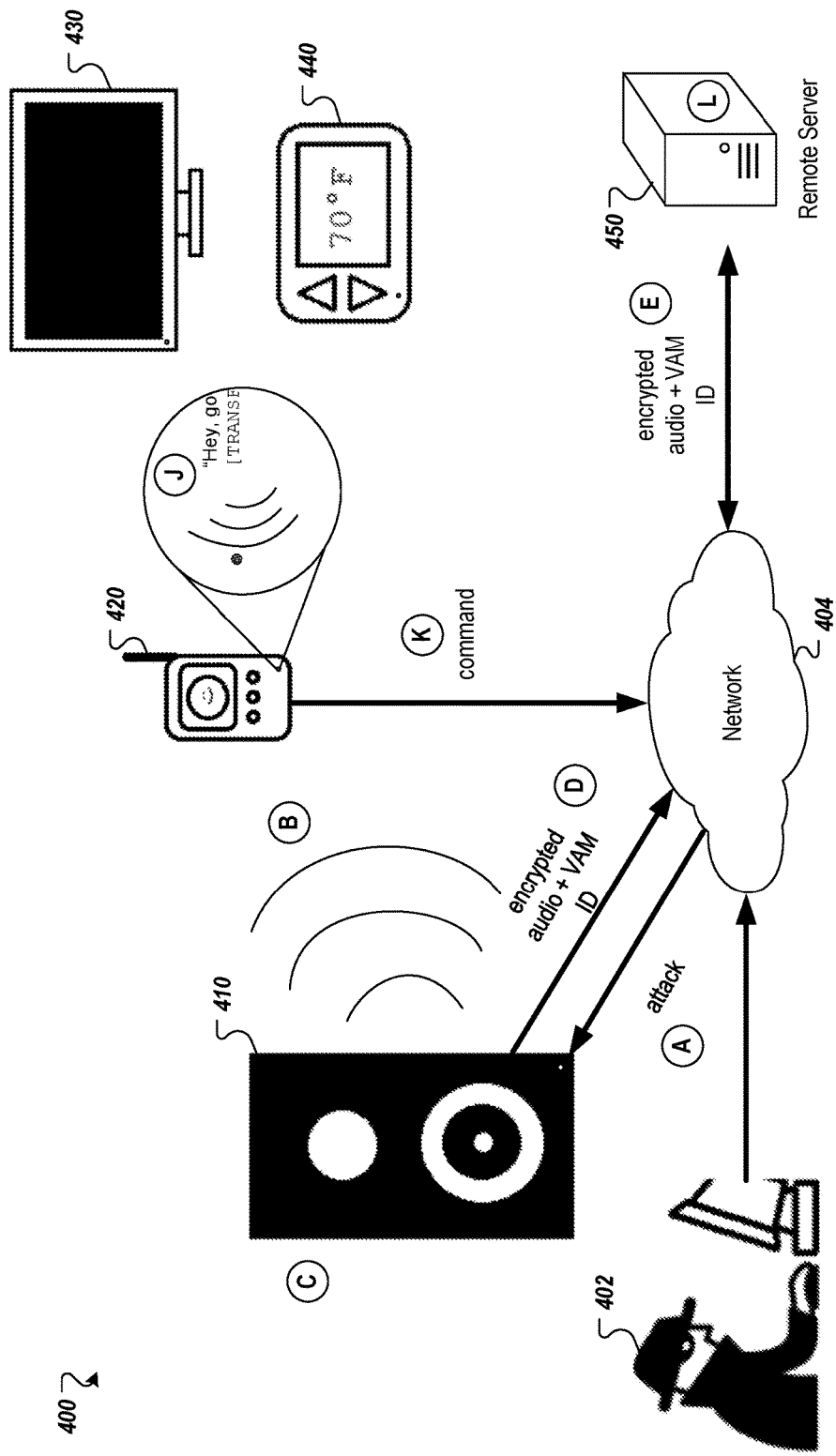

FIG. 4B is a system diagram that illustrates an example of a process 460 for preventing an audio attack. The process 460 may be performed by a system such as the audio attack prevention system 200. In the process 460, multiple host devices are connected to a remote server and are vulnerable to being compromised by picking up a fraudulent command issued from a speaker of a different host device.

The process 460 shares stages (A)-(E) with the process 400. Instead of stages (F)-(I) of the process 400, the process 460 proceeds from stage (E) to stage (J).

During stage (J), one or more of the host devices 420-440 detect the fraudulent command. In this particular example, the host device 420 detects the fraudulent command. The host device 420 processes the command as described above with respect to FIGS. 2-3. In this particular example, the host device 420 will not be able to detect that the hotword was output from its own speaker, because the hotword was output through the speaker of the host device 410. The host device 420 will then proceed as if the command received is legitimate.

The process 460 continues with stage (K), in which the host device 420 transmits the encrypted audio data including the fraudulent command to the remote server 450 through the network 404. The process 460 continues with stage (L).

During stage (L), the remote server 450 receives the fraudulent command from the host device 420 and blocks the command from being executed. The remote server 450 checks each command received from the host devices 420-440 to determine whether any of the commands correspond to the command provided with the fraudulent hotword from the host device 410. In this particular example, the remote server 450 determines that the command received from the host device 420 corresponds with the fraudulent command from the host device 410, and blocks the command.

In some examples, the remote server 450 blocks the command by blocking the command from being executed. For example, the remote server 450 will not perform the action indicated by the command TRANSFER $1000 TO BOB. In some examples, the remote server 450 blocks the command by instructing the other host devices to ignore audio input matching the fraudulent command that would have been detected as a hotword. In some examples, the remote server 450 blocks the command by disabling or overriding the primary hotword detection model in other host devices.

The remote server 450 may not perform any voice command associated with the particular instance of the fraudulent hotword. In some examples, the remote server 450 determines association with the instance of the fraudulent hotword by comparing time stamps of when the hotword occurred, when the command was received, etc. For example, the remote server 450 may determine whether the time stamps are within a certain period of time of each other, such as two seconds, ten seconds, three minutes, etc. In some examples, the remote server 450 determines association with the instance of the fraudulent hotword by comparing the encrypted audio data with the command received. For example, the remote server 450 may determine whether the encrypted audio data and the command have at least a minimum level of similarity. In some examples, the remote server 450 performs automatic speech recognition, or ASR, on encrypted audio data and the command received. In some examples, the remote server 450 uses audio processing models, such as machine learning models, that include trained neural networks to perform the ASR. The remote server 450 may then determine whether the audio segments yield a match or at least a threshold level of similarity. In some examples, the remote server 450 determines whether the types of actions requested by the encrypted audio data and the command received match. For example, the remote server 450 may determine whether both audio segments are requesting a transfer of money.

By blocking the fraudulent command at the server side, the process 460 may reduce latency during processing and transmission of messages to each of the other host devices. The process 460 allows the server to make the final decision, and does not rely on catching the fraudulent command before it is processed by the other host devices.

Figure 5:
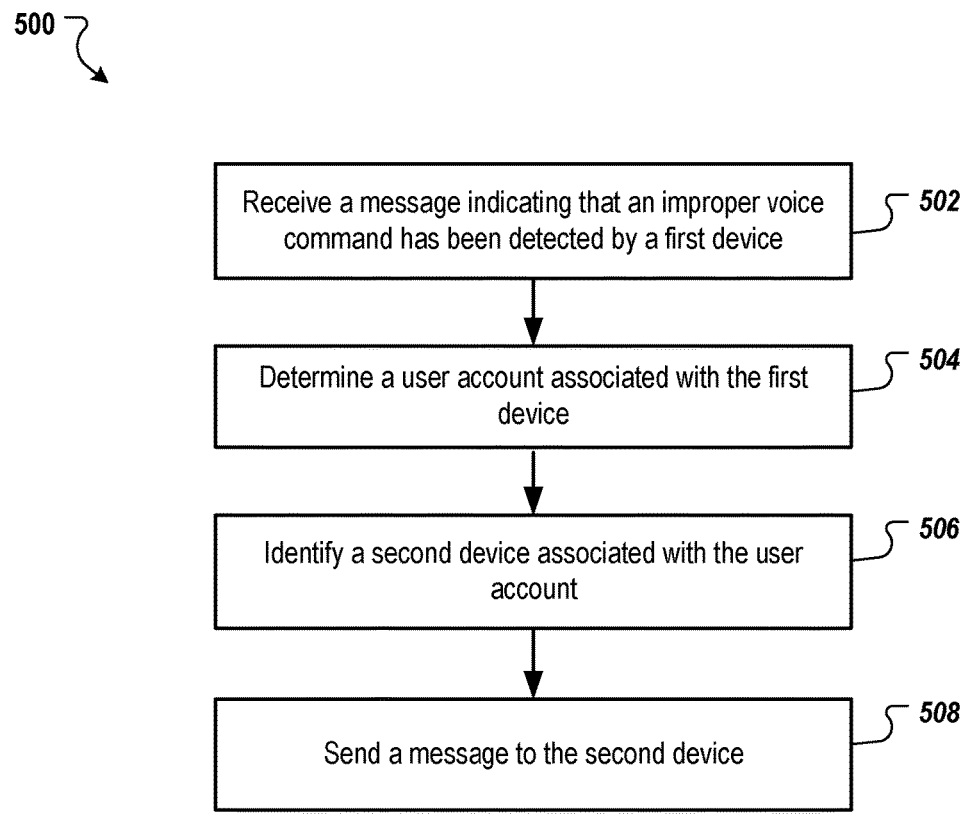

FIG. 5 is a flowchart of an example process 500 for preventing an audio attack. The process 500 may be performed by a system such as the audio attack prevention system 200 described above with respect to FIG. 2.

A remote server that processes voice commands receives a message indicating that a falsified voice command has been detected by a first device (502). For example, the remote server 450 may receive a message from a VAM of the host device 410 that a falsified voice command has been detected by the VAM, as described above with respect to FIG. 4A and stages (A)-(E).

The server may determine a user account associated with the first device (504). For example, the remote server 450 may determine an authorized user account associated with the host device 410, as described above with respect to FIG. 4A and stages (D)-(F).

The server may identify a second device associated with the user account (506). For example, the remote server 450 may identify one of the host devices 420-440 that are associated with the authorized user account, as described above with respect to FIG. 4A and stage (F).

The server may send a message to the second device (508). For example, the remote server 450 may send a message to the host devices 420-440, as described above with respect to FIG. 4A and stages (G)-(H).

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array), an ASIC (application specific integrated circuit), or a GPGPU (General purpose graphics processing unit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
   receiving, over a network by a server and from a first device, a first message, where the first message includes encrypted audio data that indicates that the first device detected that an improper voice command was audibly output by the first device;
   in response to receiving the first message that indicates that the first device detected that the improper voice command was audibly output by the first device:
   identifying, by the server, a user account associated with the first device based on the first message;
   identifying, by the server, a second device associated with the user account; and
   sending, over the network by the server to the second device, a second message, where the second message indicates that a voice command corresponding to the improper voice command that is captured by a microphone of the second device should not be performed.

2. The method of claim 1, wherein sending, over the network by the server to a second device, a second message, where the second message indicates that a corresponding voice command that is captured by a microphone of the second device should not be performed comprises:

receiving, by the server, audio data for the corresponding voice command captured by the second device from the second device;

determining, by the server, that the audio data for the corresponding voice command captured by the second device corresponds to audio data for the improper voice command detected by the first device; and in response to determining that the audio data for the corresponding voice command captured by the second device corresponds to the audio data for the improper voice command detected by the first device, not executing the corresponding voice command captured by the second device and sending the second message to the second device.

3. The method of claim 2, wherein determining that the audio data for the corresponding voice command captured by the second device corresponds to the audio data for the improper voice command detected by the first device comprises:

determining, by the one or more computing devices, that the first message and the audio data for the corresponding voice command captured by the second device are associated with the user account associated with the first device.

4. The method of claim 2, wherein determining that the audio data for the corresponding voice command captured by the second device corresponds to the audio data for the improper voice command detected by the first device comprises:

determining, by the server, that a first time at which the audio data for the improper voice command detected by the first device was detected and a second time at which the audio data for the corresponding voice command was captured by the second device are within a certain period of time.

5. The method of claim 2, wherein determining that the audio data for the corresponding voice command captured by the second device corresponds to the audio data for the improper voice command detected by the first device comprises:

determining, by the server, that the audio data for the corresponding voice command captured by the second device and the audio data for the improper voice command detected by the first device have a minimum level of similarity.

6. The method of claim 2, wherein determining that the audio data for the corresponding voice command captured by the second device corresponds to the audio data for the improper voice command detected by the first device comprises:

determining, by the server, that the audio data for the corresponding voice command captured by the second device and the audio data for the improper voice command detected by the first device request a same type of action.

7. The method of claim 2, wherein determining that the audio data for the corresponding voice command captured by the second device corresponds to the audio data for the improper voice command detected by the first device comprises:

performing, by the server, automatic speech recognition on the audio data for the corresponding voice command captured by the second device to generate a first processed audio segment;

performing, by the server, automatic speech recognition on the audio data for the improper voice command detected by the first device to generate a second processed audio segment; and determining, by the server, that the first processed audio segment and the second processed audio segment have a minimum level of similarity.

8. The method of claim 1, further comprising:

determining, by the server, a set of multiple devices associated with the user account based on at least one of: a location of each device of the set of the multiple devices, a label generated by a user of the user account, or a grouping generated by the user; and sending, by the server, a third message to each device of the set of multiple devices.

9. The method of claim 8, wherein the set of multiple devices associated with the user account is a proper subset of the multiple devices associated with the user account, and wherein each device of the set of multiple devices is selected for inclusion in the set of multiple devices based on at least one of: a location of each device of the set of the multiple devices, a label generated by a user of the user account, or a grouping generated by the user.

10. The method of claim 8, further comprising:

determining, by the server, a location of the first device based on at least one of: device registration data previously stored by the server, network connectivity data, or location data sent by the first device;

identifying, by the server and based on the location of the first device, a set of multiple devices associated with the user account, each device of the set of multiple devices having a location within a maximum distance of the location of the first device; and sending, by the server, a third message to each device of the set of multiple devices, the third message indicating that the corresponding voice command should not be performed.

11. The method of claim 1, wherein the first message indicates that the improper voice command was falsified.

12. The method of claim 1, wherein the second message to the second device prevents execution of the corresponding voice command.

13. The method of claim 1, wherein identifying, by the server, a second device associated with the user account comprises:

determining, by the server, a location of the first device based on at least one of: device registration data previously stored by the server, network connectivity data, or location data sent by the first device; and identifying, by the server and based on the location of the first device, the second device.

14. The method of claim 1, further comprising:

in response to receiving the first message, preventing, by the server, voice commands from being executed by the server for a period of time after receiving the first message.

15. The method of claim 1, wherein receipt of the second message by the second device triggers the second device to, for a period of time, block processing of voice commands in audio captured by the microphone of the second device.

16. The method of claim 1, wherein the second message indicates a time corresponding to detection of the improper voice command and the second device is triggered by the second message to ignore any voice command detected in audio captured by the microphone of the second device within a predetermined time period of the time corresponding to detection of the improper voice command.

17. The method of claim 1, wherein the first message comprises encrypted audio data, where the encrypted audio data includes an indication that the first device audibly output an improper voice command.

18. A system comprising:
one or more computers and one or more storage devices storing instructions that are operable, when executed by the one or more computers, to cause the one or more computers to perform operations comprising:
receiving, over a network by a server and from a first device, a first message, where the first message includes encrypted audio data that indicates that the first device detected that an improper voice command was audibly output by the first device;
in response to receiving the first message that indicates that the first device detected that the improper voice command was audibly output by the first device:
identifying, by the server, a user account associated with the first device based on the first message;
identifying, by the server, a second device associated with the user account; and
sending, over the network by the server to the second device, a second message, where the second message indicates that a voice command corresponding to the improper voice command that is captured by a microphone of the second device should not be performed.

19. A computer-readable storage device storing software comprising instructions executable by one or more computers which, upon such execution, cause the one or more computers to perform operations comprising:
receiving, over a network by a server and from a first device, a first message, where the first message includes encrypted audio data that indicates that the first device detected that an improper voice command was audibly output by the first device;
in response to receiving the first message that indicates that the first device detected that the improper voice command was audibly output by the first device:
identifying, by the server, a user account associated with the first device based on the first message;
identifying, by the server, a second device associated with the user account; and
sending, over the network by the server to the second device, a second message, where the second message indicates that a voice command corresponding to the improper voice command that is captured by a microphone of the second device should not be performed.

* * * * *